(12) United States Patent
Tripathi et al.

(10) Patent No.: US 8,575,773 B2
(45) Date of Patent: Nov. 5, 2013

(54) METHOD AND SYSTEM FOR OPERATING AN ELECTROMECHANICAL GENERATOR

(75) Inventors: Anshuman Tripathi, Singapore (SG); Shu Yu Cao, Singapore (SG); Victor Donescu, Westford, MA (US); Søren Andersen, Tilst (DK); Rasool Beevi D-O Mohamed Arif, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/351,303

(22) Filed: Jan. 17, 2012

(65) Prior Publication Data

US 2012/0211983 A1  Aug. 23, 2012

Related U.S. Application Data

(60) Provisional application No. 61/433,646, filed on Jan. 18, 2011.

(30) Foreign Application Priority Data

Jan. 18, 2011  (DK) .................................. 2011 70023

(51) Int. Cl.
*H02P 9/04* (2006.01)
(52) U.S. Cl.
USPC .............................................. 290/44; 322/25
(58) Field of Classification Search
USPC ................. 290/44, 55; 322/22, 23, 24, 25, 27
See application file for complete search history.

(56) References Cited

U.S. PATENT DOCUMENTS

| | | | | | |
|---|---|---|---|---|---|
| 4,625,160 | A | * | 11/1986 | Hucker | 322/32 |
| 4,799,003 | A | * | 1/1989 | Tu et al. | 322/29 |
| 5,652,485 | A | * | 7/1997 | Spiegel et al. | 318/147 |
| 5,764,036 | A | * | 6/1998 | Vaidya et al. | 322/90 |
| 6,670,721 | B2 | * | 12/2003 | Lof et al. | 290/44 |
| 6,870,350 | B2 | * | 3/2005 | Garrigan et al. | 322/28 |
| 7,253,537 | B2 | * | 8/2007 | Weng et al. | 290/44 |
| 7,710,081 | B2 | * | 5/2010 | Saban et al. | 322/89 |
| 2007/0186692 | A1 | | 8/2007 | Waszak et al. | |
| 2008/0272716 | A1 | * | 11/2008 | Yu et al. | 318/135 |
| 2011/0084671 | A1 | * | 4/2011 | Hobelsberger et al. | 322/99 |

FOREIGN PATENT DOCUMENTS

WO   0125628 A2   4/2001

* cited by examiner

*Primary Examiner* — Tulsidas C Patel
*Assistant Examiner* — Viet Nguyen
(74) *Attorney, Agent, or Firm* — Patterson & Sheridan, LLP

(57) ABSTRACT

A method for operating an electromechanical generator is provided, the method comprising: determining a magnetic field reference parameter based on an electromagnetic power reference representing a desired output of the electromechanical generator, determining a scaling factor for adjusting an air-gap magnetization level of the electromechanical generator to reduce loss in operating the electromechanical generator, modifying the magnetic field reference parameter with the scaling factor; and operating the electromechanical generator based on at least the modified magnetic field reference parameter.

16 Claims, 8 Drawing Sheets

METHOD AND SYSTEM FOR OPERATING AN ELECTROMECHANICAL GENERATOR

CROSS-REFERENCE TO RELATED APPLICATIONS

This application claims foreign priority benefits under 35 U.S.C. §119 to co-pending Danish patent application number PA 2011 70023, filed Jan. 18, 2011. This application also claims benefit of U.S. provisional patent application Ser. No. 61/433,646, filed Jan. 18, 2011. Each of the aforementioned related patent applications is herein incorporated by reference in its entirety.

BACKGROUND

The present invention relates to a method and a system for operating an electromechanical generator.

Power efficiency of Interior Permanent Magnet (IPM) generators is a function of rotor and stator geometry and the usual rules of maximum torque per ampere (MTPA) may not necessarily be optimal for every generator design. The resulting lower generator efficiency may seriously impact the power curve and can hit cost of energy (CoE) adversely. Higher generator losses often lead to higher current requirements for a given power level adversely affecting the converter losses as well. To keep the temperature of the generator converter system as per the specifications, this leads to higher cooling power which adds to the overall loss. Therefore, improved methods for reducing power loss in electromechanical generators are desired.

SUMMARY OF THE INVENTION

According to an embodiment of the present invention, a method for operating an electromechanical generator is provided, the method comprising, determining a magnetic field reference parameter based on an electromagnetic power reference representing a desired output of the electromechanical generator, determining a scaling factor for adjusting an air-gap magnetization level of the electromechanical generator to reduce loss in operating the electromechanical generator, modifying the magnetic field reference parameter with the scaling factor; and operating the electromechanical generator based on at least the modified magnetic field reference parameter.

According to one embodiment, the magnetic field reference parameter is linearly scaled with the scaling factor.

According to one embodiment, the magnetic field reference parameter is any one of a magnetization flux reference and a magnetization current reference.

According to one embodiment, the scaling factor is determined to reduce the sum of a generator copper loss and a generator core loss.

According to one embodiment, the scaling factor is determined to minimize generator loss.

According to one embodiment, the method further comprises determining the magnetic field reference parameter based on a default power loss optimization criterion which gives the ratio of a demagnetization current and a field power current of the electromechanical generator.

According to one embodiment, the initial value of the magnetic field reference parameter (or an initial value for the magnetic field reference parameter) is determined according to a generator copper loss minimization criterion.

According to one embodiment, the scaling factor is determined as the scaling factor from a plurality of scaling factors for which the determined power loss is minimal among the scaling factors of the plurality of scaling factors.

According to one embodiment, the scaling factor is determined so that the generator is operated at a demagnetization level given by the magnetic field reference parameter scaled with the scaling factor.

According to one embodiment, the scaling of the magnetic field reference parameter is determined by modifying a default ratio of a magnetization current and a field power current given by the copper loss minimization criterion determining an operation condition of the generator (e.g. an initial operation condition of the generator).

According to one embodiment, determining the scaling factor and/or fine tuning the scaling factor to improve the generator control system efficiency includes determining the scaling factor from a plurality of scaling factors as the scaling factor for which the determined power loss is minimum among the scaling factors of the plurality of scaling factors and comprises measuring the generator rotor and stator temperature for the scaling factors in the order from lowest scaling factor to highest scaling factor wherein when the generator temperature of a scaling factor is measured to be higher than the power loss measured for the previous scaling factor, the determining process is stopped and the previous scaling factor is determined as the scaling factor for which the determined generator power loss is minimal among the scaling factors.

According to one embodiment, the plurality of scaling factors are within a pre-determined scaling factor interval.

According to one embodiment, the lowest scaling factor of the plurality of scaling factors is set below unity (e.g. slightly below unity) in order to account for generator parameter variation.

According to one embodiment, the magnetic field reference parameter specifies a pre-determined initial demagnetization level.

According to one embodiment, the magnetic field reference parameter specifies a pre-determined initial demagnetization stator flux or a pre-determined initial demagnetization current.

According to one embodiment, the generator is an interior permanent magnet generator.

According to an embodiment of the present invention, systems according to the method for operating an electromechanical generator and/or the method for determining a demagnetization level for the operation of an electromechanical generator are provided.

Embodiments described in context of the method for operating an electromechanical generator as described above are analogously valid for the system for operating an electromechanical generator and the method for determining a demagnetization level for the operation of an electromechanical generator and vice versa.

According to an embodiment of the present invention, a wind turbine comprising a system for operating an electromechanical generator as described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

PCT application PCT/SG2010/000338 describes a method of controlling a wind turbine generator in which an electromagnetic power reference representing the electromagnetic power generated by the wind turbine generator is determined, wherein the electromagnetic power reference is determined based on a desired output of the wind turbine generator. The contents of this application are herein incorporated by reference in its entirety.

Figure 1:
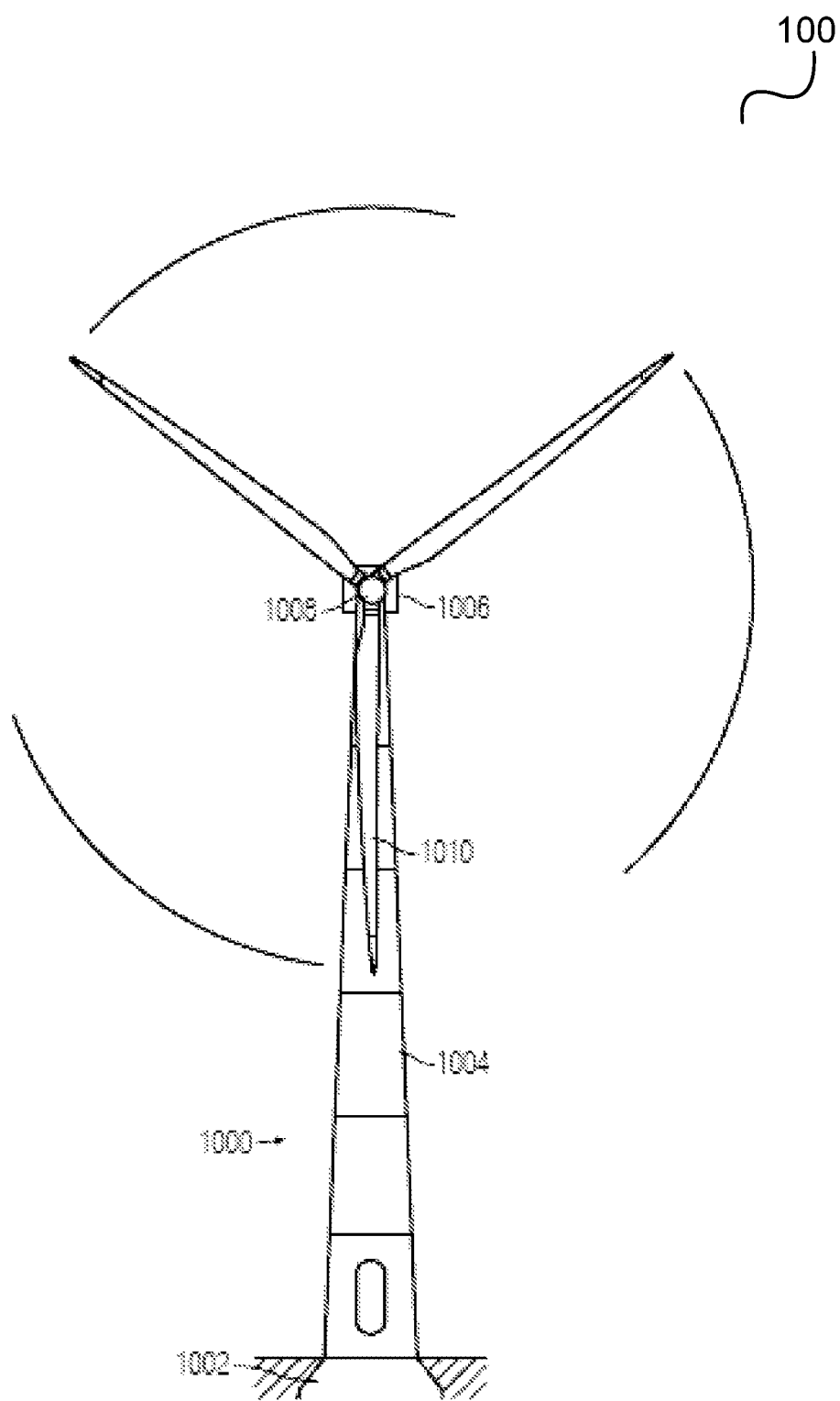
FIG. 1 illustrates a common setup of a wind turbine.

FIG. 1 illustrates a common setup of a wind turbine 100 which may use the inventive method/system as described below. The wind turbine 100 is mounted on a base 1002. The wind turbine 100 includes a tower 1004 having a number of tower sections. A wind turbine nacelle 1006 is placed on top of the tower 1004. The wind turbine rotor includes a hub 1008 and at least one rotor blade 1010, e.g. three rotor blades 1010. The rotor blades 1010 are connected to the hub 1008 which in turn is connected to the nacelle 1006 through a low speed shaft which extends out of the front of the nacelle 1006.

Figure 2:
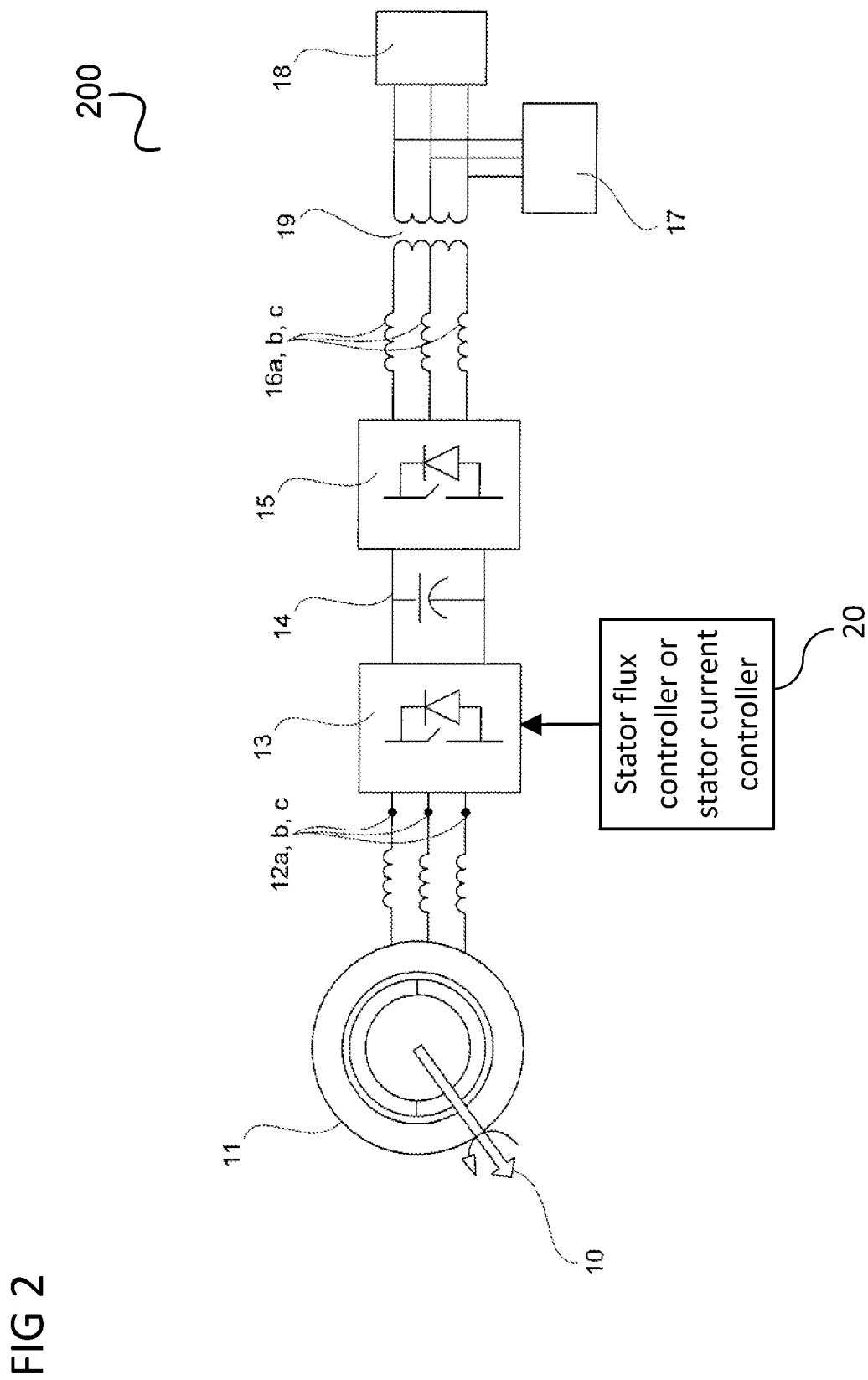
FIG. 2 illustrates an example of power generation system according to an embodiment.

FIG. 2 illustrates an example of power generation system 200 according to an embodiment.

A shaft 10 transfers mechanical energy from an energy source, for example the at least one rotor blade 1010 shown in FIG. 1, to a rotor of a variable speed generator 11. The shaft 10 is connected to the at least one rotor blade 11 and is for example connected to the rotor via a gearbox in order to adapt the rotational speed of the shaft 10 (i.e. the speed of the wind turbine blades) to a speed range suitable for the generator 11. The generator 11 converts the mechanical energy provided via the shaft 10 into electrical energy and delivers the electrical energy at a set of stator terminals 12a, 12b, 12c. The generator 11 is in this example an interior permanent magnet (IPM) generator. The rotational speed of the shaft 10 varies as a function of the wind speed. Since the rotational speed of the rotor of the generator 11 is proportional to the rotational speed of the shaft 10, the amplitude and frequency of the voltage signal provided by the generator 11 at the stator terminals 12a, 12b, 12c varies in accordance with the rotational speed of the shaft 10. The terminals 12a, 12b, 12c of the generator 11 are connected to a generator side power converter 13. The converter 13 for example comprises a set of switches in the form of, for example, MOSFETs, GTOs, IGBTs or BJTs.

The converter 13 functions, under normal operation, as an active rectifier converting the variable frequency AC voltage provided by the generator 11 into a DC voltage. The conversion may be controlled using a pulse width modulation (PWM) scheme, wherein control signals are applied to the switches of the converter 13 in order to provide the desired conversion functionality. In one embodiment, the switches are controlled by employing a space vector pulse width modulation scheme.

For a given speed of operation (i.e. a given rotor rotation speed), the electromagnetic power depends on the magnitude of the stator flux vector or stator current vector and its location with respect to the rotor flux vector. If the position of the rotor flux vector or stator current vector is known, it is possible to apply a voltage to the stator that positions the stator flux vector or stator current vector to give the desired magnitude of the power at a given rotational speed. Hence, by controlling the stator flux vector or stator current vector, the electromagnetic power, which corresponds to the power given to the load, can be obtained as desired.

The stator flux vector or stator current vector may for example be controlled by a suitable control of the generator side power converter 13. Accordingly, in one embodiment, the power generation system 200 includes a stator flux controller or stator current controller 20 which controls the generator side power converter 13 such that the power supplied by the electrical generator 11 to the power grid 18 has a desired magnitude. The stator flux controller or stator current controller 20 needs, in one embodiment, information about the rotor position, e.g. a phase angle $\theta_m$ of the rotor, and/or information about the angular speed $\omega_m$ of the rotor.

The output of the converter 13 is connected to a DC link 14 which comprises a link capacitor for reducing the voltage ripple on the DC link.

The DC link 14 is connected to a grid side power converter 15. The topology of the grid side power converter 15 may be similar to the generator side power converter 13. The grid side power converter 15 for example normally operates as an inverter for converting the DC voltage on the DC link 14 into a regulated AC voltage for feeding active and reactive power to a power grid 18.

The output of the grid side power converter 15 may be filtered by means of inductors 16a, 16b, and 16c in order to, for example, remove high order harmonics from the output power signal. The output power signal may, if needed, be filtered by a harmonic filter 17 in order to keep the interference or harmonic distortion at a low value. The output power signal is then provided to the power grid 18 via a transformer 19.

For applications in wind turbines at the megawatt (MW) level, the interior permanent magnet (IPM) generator 11 may be designed to be optimized for less weight and less volume. The resulting core loss of the generator 11 is thus typically on the same order as the copper loss in the generator 11. The generator total loss may be greatly increased which may lead to generator overheating issues when the minimum copper loss (MCL) rule is applied to achieve maximum torque per ampere (MTPA) operation. The core loss of the generator 11 depends on the generator magnetic circuit design, the generator speed, the PWM switching pattern, and the flux/current vector distribution. For a given rotating speed level and a given output power level, it is typically desirable that the generator 11 operates on the optimized stator flux/current distribution trajectory so that the total loss of core loss and copper loss is minimized.

The core loss of an IPM generator includes the hysteresis loss, the eddy-current loss and the excess loss. Assuming sinusoidal magnetic field distribution and neglecting the skin effect, the iron losses per unit of a IPM generator can be represented as $$P_{iron} = P_{hysteresis} + P_{eddy} + P_{excess} \quad (1)$$
$$= K_{hysteresis} * f * B_m^2 + K_{eddy} * f^2 * B_m^2 + K_{excess} * f^{3/2} * B_m^{3/2}.$$

From the analytical core loss model according to equation (1) it can be seen that it is possible to reduce the generator core loss by applying an appropriate level of demagnetization current to reduce the magnitude of the fundamental component of air-gap flux density.

Figure 3:
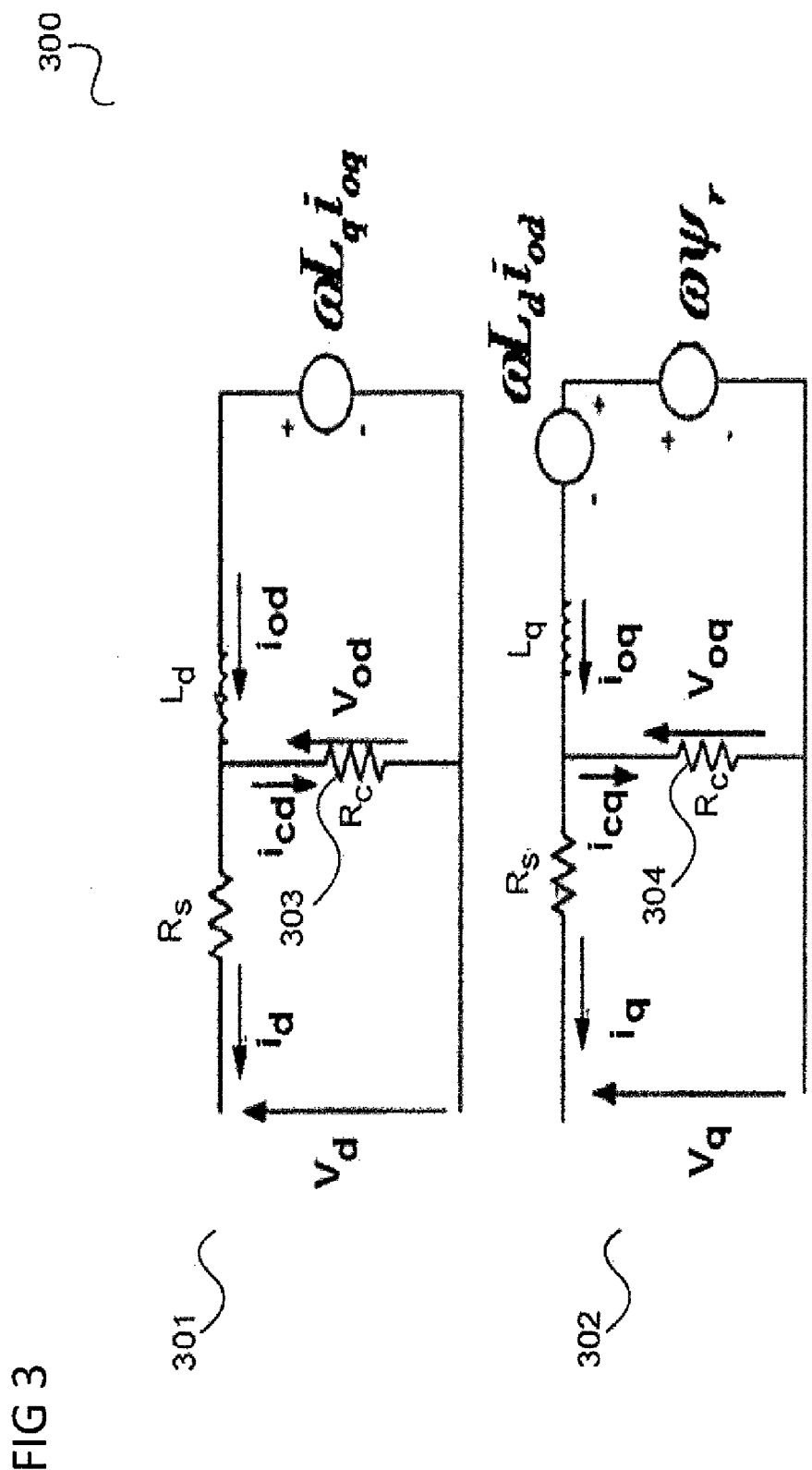
FIG. 3 shows a equivalent circuit model for an electromechanical generator according to an embodiment.

Generator core loss may also be used based on the equivalent circuit model including core loss resistance $R_c$ as illustrated in FIG. 3.

FIG. 3 shows a equivalent circuit model 300 for an electromechanical generator according to an embodiment.

The equivalent circuit model 300 is represented in dq reference frame and includes a d-axis equivalent circuit 301 and q-axis equivalent circuit 302, with d-axis alighted with the rotor flux vector axis and q-axis 90° leading the d-axis.

Core loss is modeled by a first resistor 303 in the d-axis equivalent circuit 301 and a second resistor 304 in the q-axis equivalent circuit 302 with the resistance $R_c$.

Additionally, the following denotations are used in the equivalent circuit model 300:

$V_q, V_d$: d-axis and q-axis component of stator voltage, respectively;
$i_q, i_d$: d-axis and q-axis component of stator current after deduction of core loss and copper loss, respectively;
$R_s$: generator stator winding resistance;
$L_q, L_d$: d-axis and q-axis component of generator stator inductance, respectively;
$i_{cq}, i_{cd}$: d-axis and q-axis component of currents representing the stator and rotor core loss, respectively;
$V_{oq}, V_{od}$: generator output voltage before resistance drop on stator winding resistance $R_s$, respectively
$i_{oq}$, iod: d-axis and q-axis component of generator output stator current before deduction of core loss and copper loss, respectively;
$\omega$: rotor rotating speed
$\Psi_r$: rotor magnetic flux amplitude.

According to the dq frame equivalent circuit model 300, the generator core loss may be estimated as $$P_{core} = \frac{\omega^2}{R_c}\{(\psi_r + L_d * i_{od})^2 + (L_q * i_{oq})^2\} \quad (2)$$

The core loss resistance can be computed as:

$$R_c = \frac{V_d^2 + V_q^2 - \omega^2(\psi_r + (L_d - L_q) * i_q^2)}{V_q * i_q - \omega * \psi_r * i_q - R_s * i_q^2} \quad (3)$$

Due to local flux density variation caused by saturation effect, the exact transfer function from stator current and stator voltage to core loss is much more complicated than what is derived from the equivalent circuit model 300, especially at high speed and high power operation condition. From the equivalent circuit model 300, it can however be seen that a loss minimized IPM generator operation can be achieved by appropriate distribution of the stator flux vector (or, equivalently, the stator current vector) at a given speed level and given power level.

Although there is no simple equation that can be applied in practice for on-line loss optimization control of an IPM generator, according to one embodiment a method for reducing generator power loss is used that can be seen to be based on changing the flux or current distribution toward the direction of increasing or decreasing the magnetization flux or current level so that the generator core loss can be reduced as the insight gained by the above theoretical analysis.

It should be noted that the stator flux/current vector distribution for minimization of the total loss including both core and copper loss, at a given speed level and given power level may be obtained from the generator designers computed from finite element analysis (FEM) for a specific machine design. A more practical way to obtain an optimized stator flux/current vector distribution for an off-the-shelf IPM machine may be to perform power mapping test. For example, a polynomial curve fitting of a stator flux/current vector distribution trajectory obtained in the power mapping test may be implemented in the final product for power generation control. The power mapping test is typically carried out to apply different combination of stator flux/current vector on the generator for a few speed level and power level along the generator power curve with the stator and rotor temperature readings recorded. The loss minimized stator flux/current vector distribution is obtained when the lowest generator temperature is achieved for the given speed and given power.

The power mapping test process may however be quite complicated and not easy to be practiced. It typically requires special testing software to disconnect the generator power control loop. In each power mapping test step, a set of stator flux/current vector references is manually fed into the generator control system when only the stator flux/current inner-loop is enabled. To search for a loss minimized operation point, quite a few sets of stator flux/current vector excitation are typically required and the data collected is off-line processed. Further, it should be noted that there is the possibility of human error introduced in the power mapping test.

Figure 4:
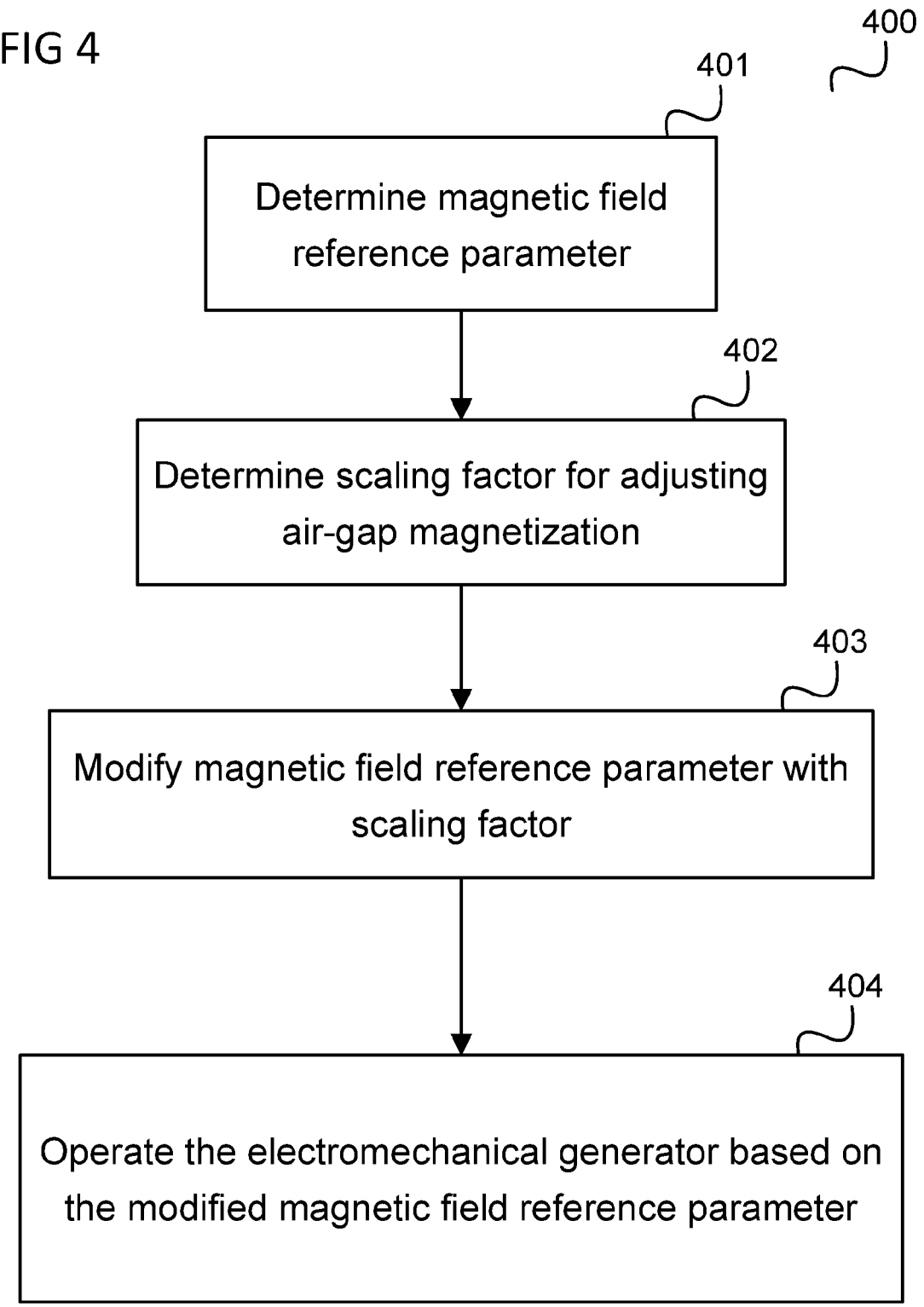
FIG. 4 shows a flow diagram according to an embodiment.

According to one embodiment, an electromechanical generator is operated according to the method illustrated in FIG. 4.

FIG. 4 shows a flow diagram 400 according to an embodiment.

In 401, a magnetic field reference parameter is determined based on an electromagnetic power reference representing a desired output of the electromechanical generator.

In 402, a scaling factor for adjusting the air-gap magnetization level of the electromechanical generator to reduce loss in operating the electromechanical generator is determined.

In 403, the magnetic field reference parameter is modified with the scaling factor.

In 404, the electromechanical generator is operated based on at least the modified magnetic field reference parameter In one embodiment, in other words, an electromechanical generator is operated in accordance with a magnetic field reference parameter that is modified (e.g. linearly scaled) to adjust an air-gap magnetization level of the electromechanical generator, e.g. for reducing power loss of the electromechanical generator. The magnetic field reference parameter may be seen to give a default magnetization level for example determined according to a certain criterion, e.g. the minimum copper loss rule.

In one embodiment, operation of an electromechanical generator is controlled by determining an initial demagnetization level (e.g. the demagnetization level for which generator copper loss is minimized) and using it as a basis for the determination of the demagnetization level at which power loss (e.g. total power loss including copper loss and core loss) is minimized. For this, power loss is determined (e.g. measured) for different initial demagnetization level scalings (in other words weightings) of the demagnetization level. A demagnitization level may for example be given by a demagnetization value or a trajectory of demagnetization values, e.g. depending on d-axis demagnetization stator flux/current with respect to q-axis stator current. In other words, the initial demagnetization level may for example correspond to an initial demagnetization signal (e.g. comprising signal values for all values of d-axis demagnetization stator flux/current with respect to q-axis stator flux/current) and the scaled initial demagnetization level may correspond to the initial demagnetization signal wherein the ratio of d-axis demagnetization current with respect to the q-axis stator current is scaled according to the scaling factor, e.g. multiplied by the scaling factor. The demagmnetization values, or, correspondingly, the signal values of the demagnetization signal, may for example specify a stator flux or a stator current.

In one embodiment, a method for IPM generator loss optimization control in closed-loop power control using an adjustable scaling factor applied to change the stator flux/current vector distribution trajectory based on minimum copper loss (MCL) rule. In other words, the initial demagnetization level is in this embodiment given by the stator flux/current vector distribution trajectory determined in accordance with the minimum copper loss (MCL) rule. The MCL based stator flux/current distribution trajectory may be seen as the built-in default optimization rule for the generator power control that is used as starting point of tuning for loss minimization generator operation.

In one embodiment, an adjustable scaling factor is set as an input parameter which is smoothly changed from an initial value to a target value in the generator controller. The scaling factor may be limited in certain range so that it has negligible effect on the system dynamics response. The change of the scaling factor may be carried out such that it does not affect the control system stability.

In the following, generator control for minimizing power loss in context of a stator flux feedback control system according to one embodiment is described.

Figure 5:
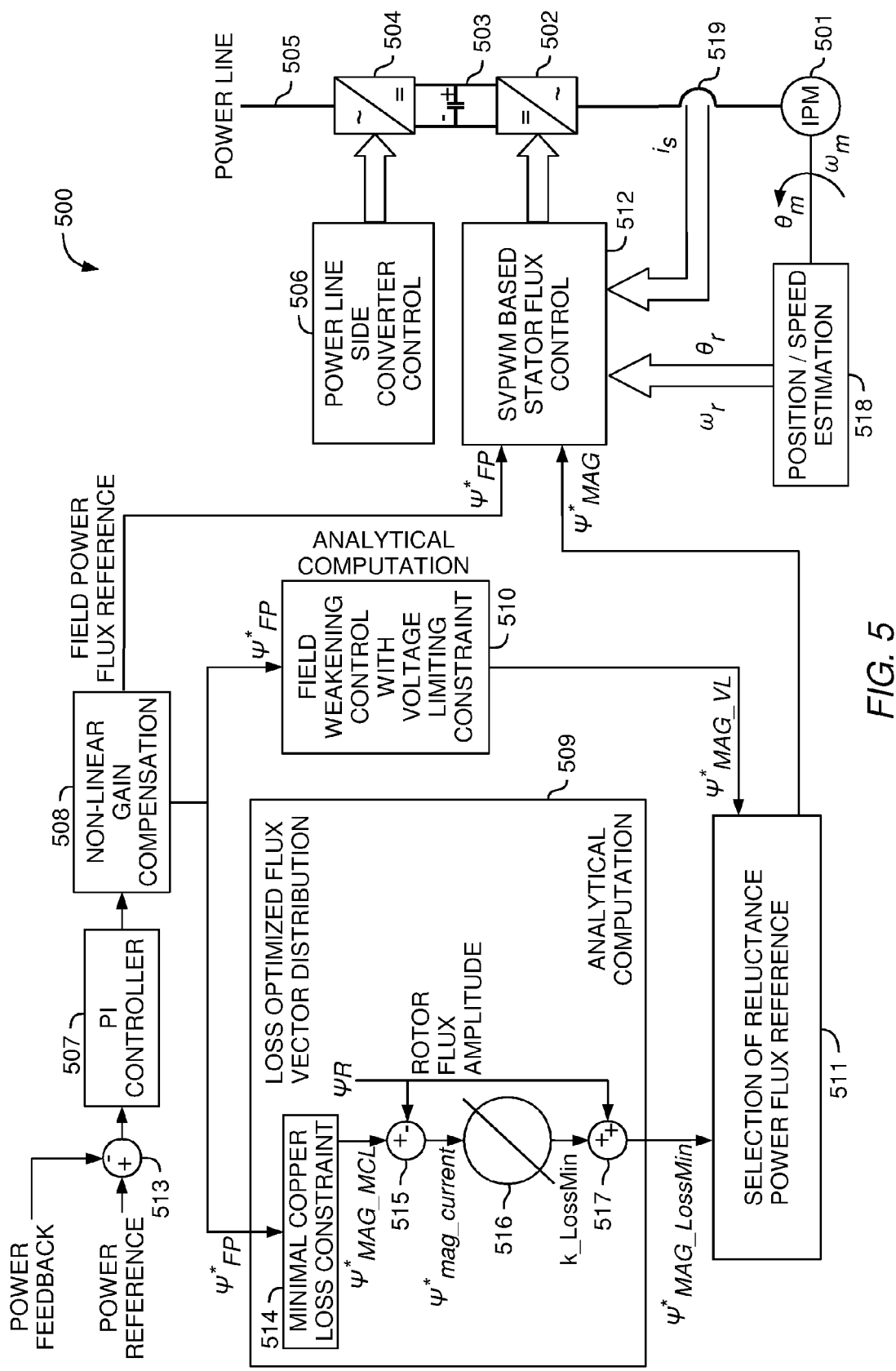
FIG. 5 shows a power generation system comprising a stator flux feedback control system according to an embodiment.

FIG. 5 shows a power generation system 500 comprising a stator flux feedback control system according to an embodiment of the invention.

The power generation system 500 includes, similarly to the power generation system 200, an electromechanical generator 501, a generator side power converter 502 and a grid side (or power line side) power converter 504 coupled by a DC link 503. The power generation system 500 is connected via a power line 505 to a power grid. The power line 505 for example includes a line filter, for example corresponding to the inductors 16a, 16b, 16c and the grid side harmonic filter 17 and a grid isolation transformer 19 shown in FIG. 2. The grid side power converter 504 is controlled by a grid side (or power line side) power converter controller 506.

The power generation system 500 includes a stator flux feedback control system including a first subtractor 513, a power controller (e.g. a PI controller) 507, a non-linear gain compensation unit 508, a loss optimized flux vector distribution determination unit 509, a field weakening control unit 510, a selection unit 511 and a stator flux control unit 512. The stator flux feedback control system may be seen to correspond to the stator flux controller 20 of the power generation system 200 described with reference to FIG. 2.

The first subtractor 513 subtracts a measured generator side power P from a generator side output power reference P*. The result of the subtraction, which may be seen as a generator power error signal is supplied to power controller 507. The power controller generates an (uncompensated) field power generation flux reference signal that is fed to the non-linear gain compensation unit 508 which compensates IPM non-linearity in torque generation. The output of the non-linear gain compensation unit 508 is the field power flux vector reference signal $\psi_{FP}^*$.

The field power flux vector reference signal $\psi_{FP}^*$ is fed to a demagnetization flux vector reference signal determining unit 514 of the loss optimized flux vector distribution determination unit 509 which computes the demagnetization flux vector reference signal $\psi_{MAG\_MCL}^*$ (in other words an initial demagnetization flux vector level) based on the minimum copper loss rule according to $$\psi_{MAG\_MCL}^* = \frac{2L_q - L_d}{2(L_q - L_d)}\psi_r - L_d * \sqrt{\frac{\psi_r^2}{4(L_q - L_d)^2} + \left(\frac{\psi_{FP}^*}{L_q}\right)^2} \quad (4)$$

A second subtractor 515 which is part of the loss optimized flux vector distribution determination unit 509 subtracts the rotor flux amplitude $\Psi_r$ from the demagnetization flux vector reference signal $\psi_{MAG\_MCL}^*$.

The result is scaled by a scaling unit 516 with an adjustable scaling factor k_LossMin to allow linear scaling of the flux component corresponding to the demagnetization current. An adder 517 adds the rotor flux amplitude $\Psi_r$ to the output of the scaling unit 516. The output of the adder 517 is a modified demagnetization flux vector signal $\psi_{MAG\_LossMin}^*$ which is thus given by $$\psi_{MAG\_LossMin}^* = k\_LossMin*(\psi_{MAG\_MCL} - \psi_r) + \psi_r. \quad (5)$$

Based on equations (4) and (5), the modified demagnetization flux vector signal $\psi_{MAG\_LossMin}^*$ can be written as $$\psi_{MAG\_LossMin}^* = k\_LossMin* \quad (6)$$

$$\left(\frac{2L_q - L_d}{2(L_q - L_d)}\psi_r - L_d * \sqrt{\frac{\psi_r^2}{4(L_q - L_d)^2} + \left(\frac{\psi_{FP}^*}{L_q}\right)^2} - \psi_r\right) + \psi_r$$

It should be noted that when k_LossMin=1, the flux vector distribution rule according to equation (6) minimizes generator copper loss when used as a basis for stator flux control. With increasing of k_LossMin value, more demagnetization current and less field power current are applied, which reduces the fundamental air-gap flux density and core-loss. With further increasing of k_LossMin, the copper loss is greatly increased and core loss may also increase due to the increased harmonic component of the air-gap flux due to interaction of the stator field and magnet field. The minimization of total loss ("copper+core" loss) is achieved at a certain value of k_LossMin when lowest generator temperature is achieved for a certain power level at a given speed level.

The modified demagnetization flux vector signal $\psi_{MAG\_LossMin}^*$ is supplied, together with a voltage limiting demagnetization flux vector signal $\psi_{MAG\_VL}^*$ generated by the field weakening control unit 510 from the field power flux vector reference signal $\psi_{FP}^*$, to the selection unit 511 which selects the one with minimum flux magnitude from the modified demagnetization flux vector signal $\psi_{MAG\_LossMin}^*$ and the demagnetization flux vector signal $\psi_{MAG\_VL}^*$ as the magnetization flux vector signal $\psi_{MAG}*$ be applied as an input to the stator flux vector controller.

The magnetization flux vector signal $\psi_{MAG}*$ and the field power flux vector reference signal $\psi_{FP}*$ are supplied to the stator flux control unit 512 which controls stator flux by controlling the generator side power converter 502 based on these command signals and applying the flux vector feedback control. The flux vector controller output are stator voltage reference signal which is fed into space vector pulse width modulator (SVPWM) to generate the generator side IGBT gating signals.

For this, the stator flux control unit 512 is supplied from a position and speed estimation unit 518 with information about rotor rotating speed ω and rotor flux position $\theta_r$ and with the measured stator current $i_s$ from a sensor 519.

In the following, generator control for minimizing power loss in context of a stator current feedback control system according to one embodiment is described.

Figure 6:
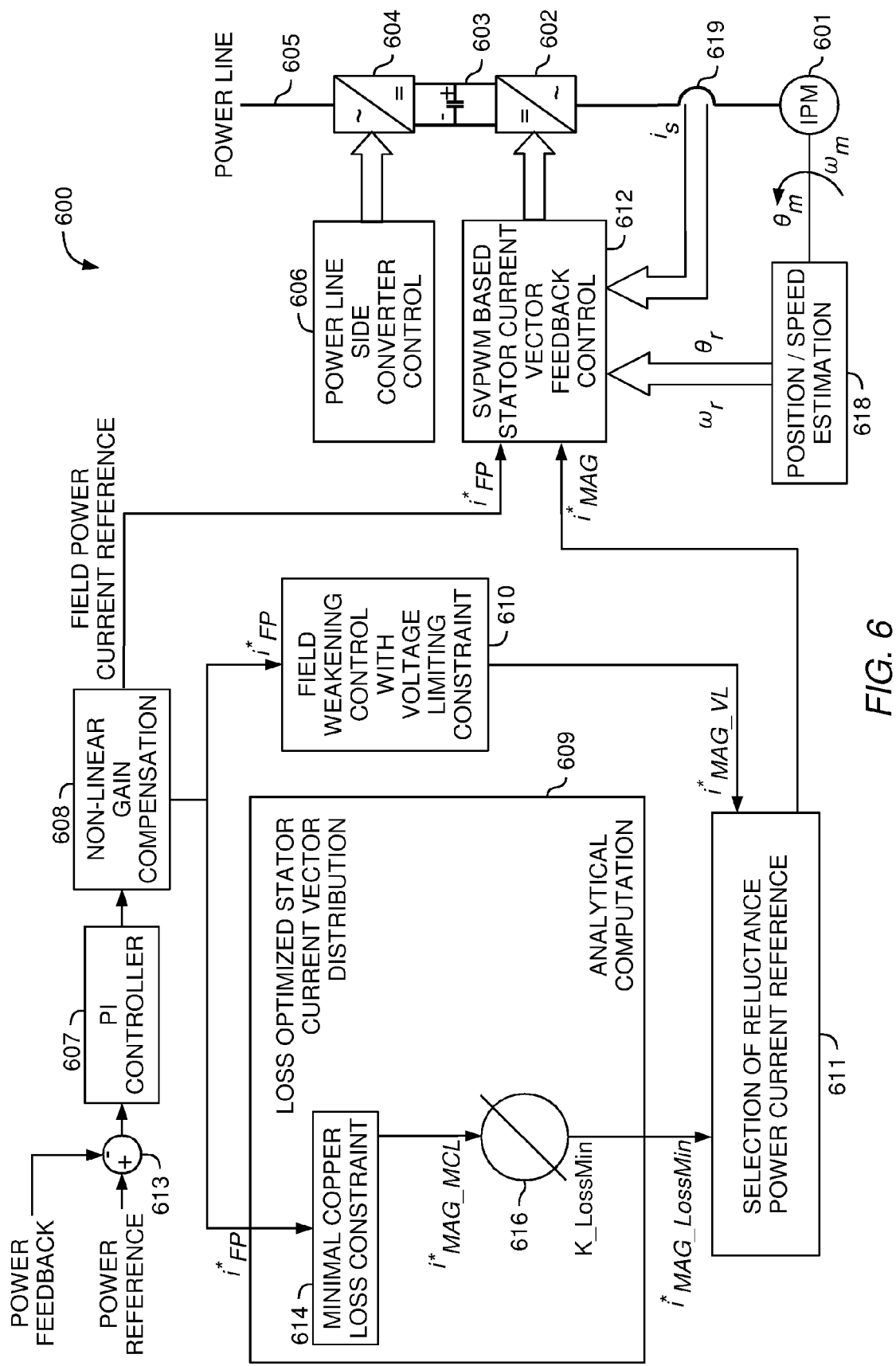
FIG. 6 shows a power generation system comprising a stator current feedback control system according to an embodiment.

FIG. 6 shows a power generation system 600 comprising a stator current feedback control system according to an embodiment of the invention.

The power generation system 600 includes, similarly to the power generation system 200 and the power generation system 600, an electromechanical generator 601, a generator side power converter 602 and a grid side (or power line side) power converter 604 coupled by a DC link 603. The power generation system 600 is connected via a power line 605 to a power grid. The power line 605 for example includes a line filter, for example corresponding to the inductors 16a, 16b, 16c, the grid harmonic filter 17, and grid side isolation transformer 19 as shown in FIG. 2. The grid side power converter 604 is controlled by a grid side (or power line side) power converter controller 606.

The power generation system 600 includes a stator current feedback control system including a subtractor 613, a power controller (e.g. a PI controller) 607, a non-linear gain comensation unit 608, a loss optimized current vector distribution determination unit 609, a field weakening control unit 610, a selection unit 611 and a stator current control unit 612.

The subtractor 613 subtracts a measured generator side power P from a generator side output power reference P*. The result of the subtraction, which may be seen as a grid power error signal is supplied to power controller 607. The power controller outputs generates an (uncompensated) field power generation current reference signal that is fed to a non-linear gain compensation unit 608 which compensates IPM non-linearity in torque generation. The output of the non-linear gain compensation unit 608 is the field power current vector reference signal $i_{FP}*$.

The field power current vector reference signal $i_{FP}*$ is fed to a demagnetization current vector reference signal determining unit 614 of the loss optimized current vector distribution determination unit 609 which computes the demagnetization current vector reference signal $i_{MAG_{MCL}}*$ (in other words an initial demagnetization current vector level). based on the minimum copper loss rule.

The demagnetization current vector reference signal $i_{MAG\_MCL}*$ is scaled by a scaling unit 616 with an adjustable scaling factor k_LossMin to minimize power loss. The result of the scaling unit 616 is a modified demagnetization current vector signal $i_{MAG\_LossMin}*$ which is given by $$i^*_{MAG\_LossMin} = \text{k\_LossMin} * \left( \frac{\psi_r}{2(L_q - L_d)} - \sqrt{\frac{\psi_r^2}{4(L_q - L_d)^2} + (i^*_{FP})^2} \right) \quad (7)$$

The modified demagnetization current vector signal $i_{MAG\_LossMin}*$ is supplied, together with a voltage limiting demagnetization current vector signal $i_{MAG\_VL}*$ generated by the field weakening control unit 610 from the field power current vector reference signal $i_{FP}*$ to the selection unit 611 which selects the one with larger demagnetization current amplitude from the modified demagnetization current vector signal $i_{MAG\_LossMin}*$ and the demagnetization current vector signal $i_{MAG\_VL}*$ as the magnetization current vector signal $i_{MAG}*$ to be applied.

The magnetization current vector signal $i_{MAG}*$ and the field power current vector reference signal $i_{FP}*$ are supplied to the stator current control unit 612 which controls stator current by controlling the generator side power converter 602 based on current feedback control to track these command signals. The output of current vector feedback control is stator voltage reference signals which are fed into the space vector pulse width modulator (SVPWM) to generate the IGBT gating signals applied at generator side converter.

For this, the stator current control unit 612 is supplied from a position and speed estimation unit 618 with information about rotor rotating speed ω and rotor flux position angle $\theta_r$ and with the measured stator current $i_s$ from a sensor 619.

In the following, a method for determining k_LossMin according to an embodiment is described.

Figure 7:
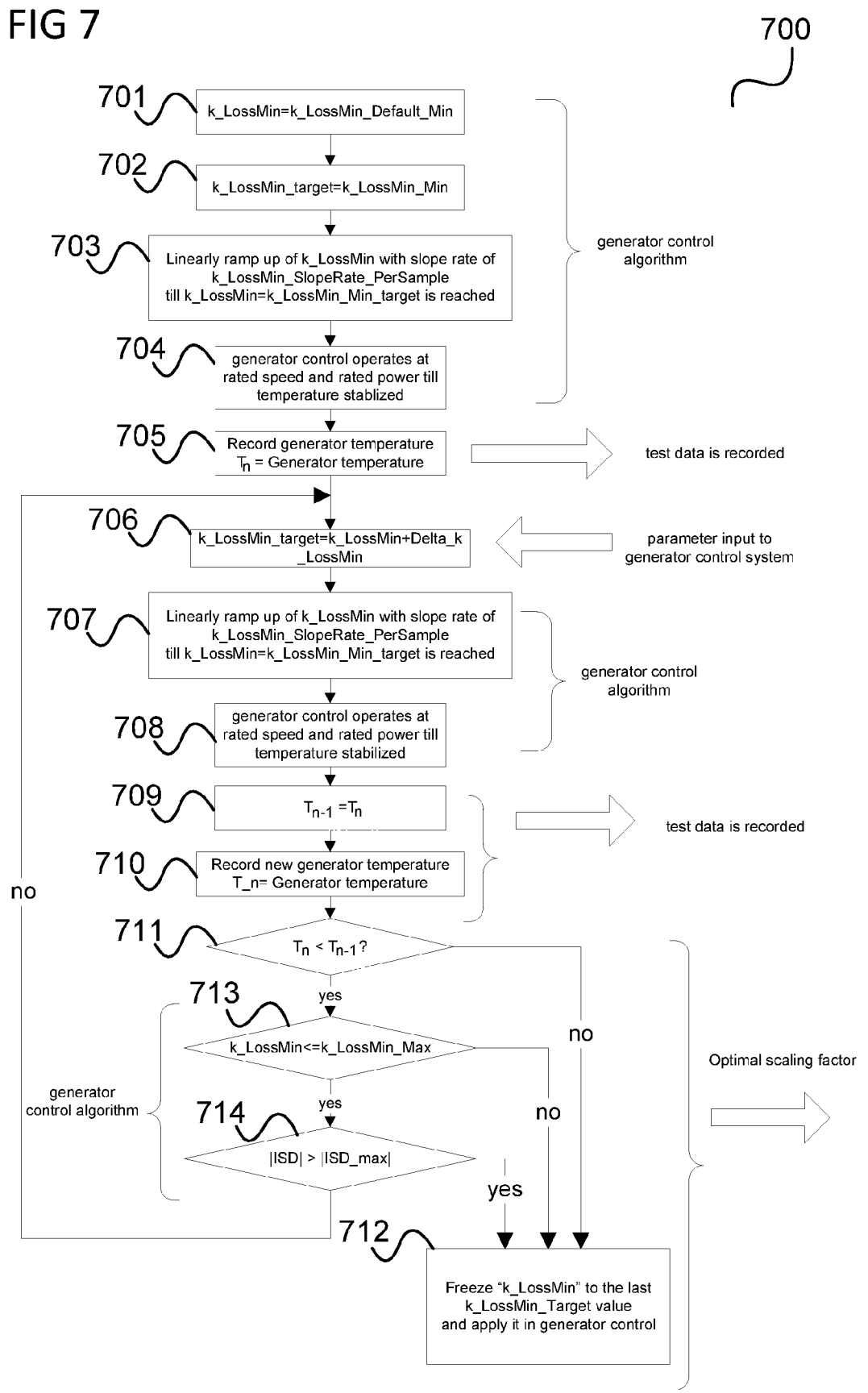
FIG. 7 shows a flow diagram according to an embodiment.

FIG. 7 shows a flow diagram 700 according to an embodiment.

The flow illustrates a procedure based on a heat-run bench test to obtain the value of k_LossMin for which total loss (including both core loss and copper loss) of the IPM generator 501, 601 is minimized. The procedure is carried out in accordance with a control algorithm and may for example be carried out using the power generation system 500 or the power generation system 600.

To ensure the generator control system stability, both maximum limit and minimum limit are set for k_LossMin according to the control algorithm, which are denoted as k_LossMin_Min and k_LossMin_Max.

The test starts in 701 with k_LossMin equal to its minimum (default) value k_Loss_Default_Min. The minimum value of k_LossMin may be set slightly below unity so that the generator parameter derivation from the nominal values used for the MCL rule computation can be taken into account.

Further, to ensure generator control system stability, smooth change of k_LossMin is forced in control algorithm with a ramping slope limiting feature. The initial target value of k_LossMin denoted as k_LossMin_Target is an input parameter modifiable and is in this example set in 702 to a value k_LossMin_Min.

In 703 k_LossMin is incrementally increased to the value k_LossMin_Target with a constant ramp rate K_LossMin_SlopeRate_PerSample.

In 704, the power generation system is operated for the current value of k_LossMin (i.e. to the value of k_LossMin_Target) until the temperature of the generator has stabilized.

In 705, the temperature of the generator for the current value of k_LossMin is recorded as current temperature (or temperature for the current value of k_LossMin) $T_n$. For example, it is automatically detected that the temperature has stabilized and the temperature is then stored in a memory in association with the current value of k_LossMin. Alternatively, a test engineer may record the stabilized temperature.

In 706, k_LossMin_target is increased by an incremental value Delta_k_LossMin. This is for example done automatically after storing of the stabilized temperature. Delta_k_LossMin is for example a predefined step size for increasing K_LossMin_Target value in generator heat-run test step-by-step.

In one embodiment in which the generator temperature reading is not available for the generator control algorithm, e.g. is not automatically supplied to the algorithm, a test engineer may input the k_LossMin_Target value to the generator control system via user interface and record the generator rotor and stator temperature readings.

In 707, similarly to 703, k_LossMin is incrementally increased to the value k_LossMin_Target with the constant ramp rate k_LossMin_SlopeRate_PerSample.

In 708, similarly to 704, the power generation system is operated for the current value of k_LossMin (i.e. to the current value of k_LossMin_Target) until the temperature of the generator has stabilized.

In 709 the temperature recorded previously (i.e. for the value of k_LossMin_Target before its last increase) is assigned as previous temperature $T_{n1}$.

In 710, similarly to 705, the temperature of the generator for the current value of k_LossMin is recorded as current temperature $T_n$.

In 711, the current temperature $T_n$ is compared with the previous temperature $T_{n1}$.

If the current temperature $T_n$ is not smaller than the previous temperature $T_{n1}$, the procedure continues with 712.

In 712, k_LossMin is frozen to its current value, i.e. is set to the current value of k_LossMin_Target. This value of k_LossMin may then be used for the operation of the power generation system for scaling the initial demagnetization level (e.g. given by the demagnetization flux vector reference signal $\psi_{MAG\_MCL}^*$ or the demagnetization current vector reference signal $i_{MAG\_MCL}^*$). In other words, the value of K_LossMin_Target which gives the lowest temperature reading is interpreted as the value that could achieve generator loss minimization operation.

If the current temperature $T_n$ is not smaller than the previous temperature $T_{n1}$, the procedure continues with 713.

In 713, it is checked whether k_LossMin is smaller or equal to k_LossMin_Max.

If k_LossMin is not smaller or equal to k_LossMin_Max the procedure continues with 712.

If k_LossMin is smaller or equal to k_LossMin_Max, the procedure continues with 714.

In 714, to ensure that the generator is not demagnetized accidently with very large demagnetization current, it is checked whether the amplitude of the demagnetization current ISD is higher than its maximum limit |ISD_max|.

If the absolute value of ISD is higher than the absolute value of ISD_max the procedure continues with 712.

If the absolute value of ISD is less than the absolute value of ISD_max, the procedure continues with 706, i.e. with the next iteration.

It should be noted that in on embodiment, in which the generator temperature is supplied to the generator control algorithm, e.g. to a generator control circuit (for example running a generator control software), the procedure according to FIG. 7 can be carried out automatically without the involvement of a test engineer. For example, an automatic test and control circuit according to the procedure for generator loss minimized operation may be used.

Figure 8:
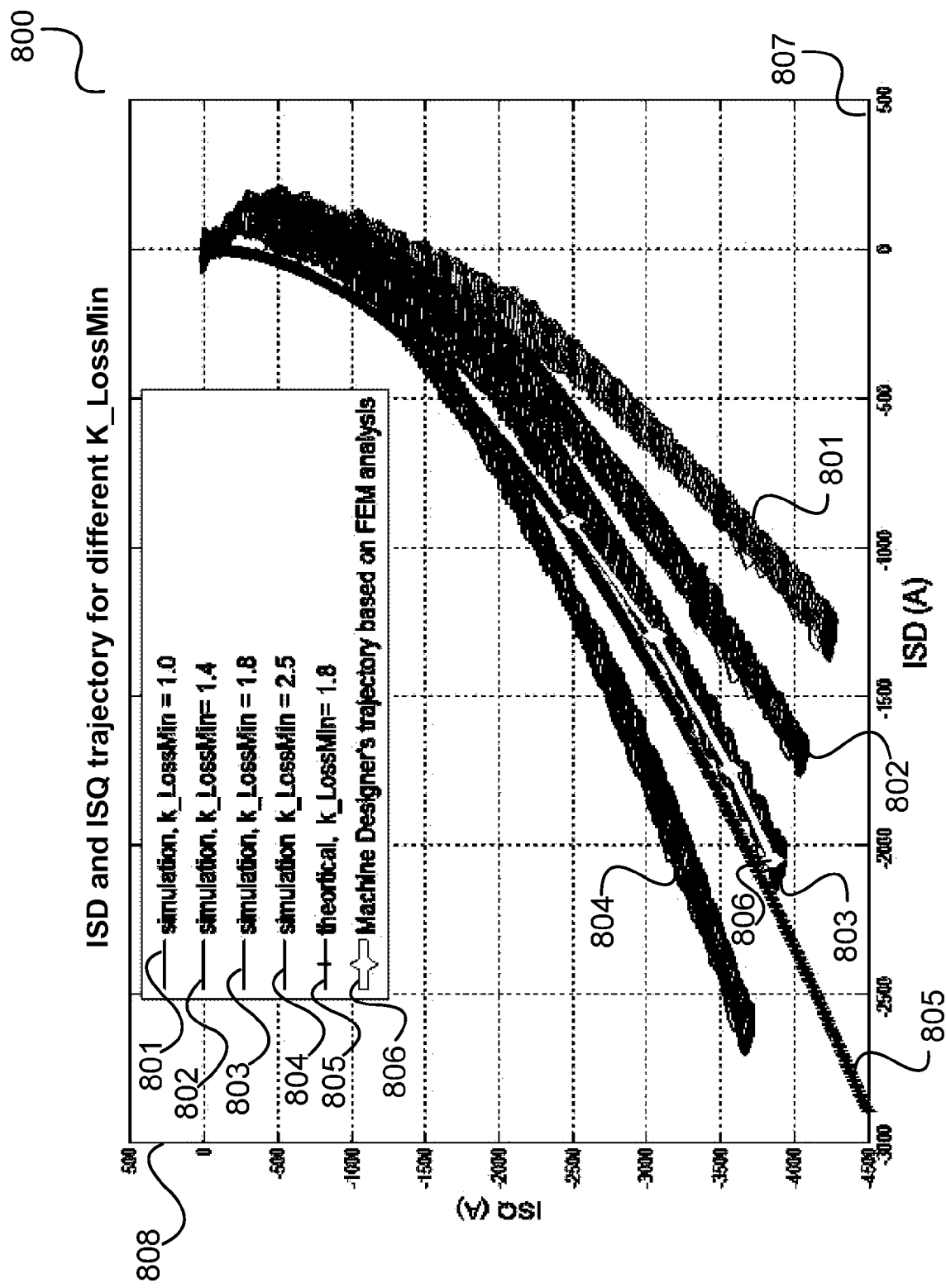
FIG. 8 shows a current trajectory diagram.

In FIG. 8, a set of simulated current vector trajectories in rotor flux DQ reference frame for different values of K_lossMin for a 3 MW IPM generator are illustrated.

FIG. 8 shows a current trajectory diagram 800.

In FIG. 8, currents are given in DQ reference frame. The magnitude of D-axis current component increases along a first axis 807 and the magnitude of Q-axis current component increases along a second axis 808.

A first trajectory 801 corresponds to the value k_LossMin=1.0, a second trajectory 802 corresponds to the value k_LossMin=1.4, a third trajectory 803 corresponds to the value k_LossMin=1.8, and a fourth trajectory 804 corresponds to the value k_LossMin=2.5.

A fifth trajectory 805 is the theoretical trajectory for k_LossMin=1.8.

A sixth trajectory 806 is the optimized trajectory obtained from FEM analysis.

It can be seen that for K_LossMin=1.8, the current vector distribution trajectory (third trajectory 803) matches well with the current trajectory obtained from FEM analysis.

In the practice, for an off-the-shelf generator, a generator heat-run bench test (e.g. according to FIG. 7) may be applied to obtain the best k_LossMin value. Even for an internal built IPM generator with known optimized flux/current distribution trajectory obtained from FEM analysis, it may still be desirable to find the best k_LossMin value for loss minimum operation from bench test results so that the machine design variation due to imperfect generator material property and imperfect manufacturing process can be taken into account.

Embodiments such as the one above offer a generic approach to optimize generator loading for loss minimization leading to high machine efficiencies at a given operating point for an off-the-shelf IPM generator.

The minimum copper flux/current distribution trajectory may be used as built-in default optimization rule applied in the generator control before start of loss minimization operation. As described above, it may be used as the starting point of tuning for loss minimization generator operation.

The default stator flux/current vector distribution trajectory may be effectively modified by an adjustable scaling factor to achieve more demagnetization current by increasing k_lossMin or less demagnetization current by reducing k_LossMin. The value of k_LossMin thus may be seen to change the optimization rule applied in generator torque distribution.

The generator control system stability may be ensured by limiting the k_LossMin value in a certain range and forcing a smooth change on k_LossMin value applied in the generator power control as for example described above in context of FIG. 7.

IPM generator parameter variation with respect to the nominal values applied in the minimum copper loss equation may be taken into account by setting the initial k_LossMin value less than unity before searching for a loss minimized k_LossMin value.

An appropriate k_lossMin value for the loss minimized operation can be obtained from an IPM generator heat-run bench test with a temperature sensor installed in the both generator stator and generator rotor segment.

Embodiments, e.g the embodiment described with reference to FIG. 7, provide a simple test procedure with little chance of human error to be introduced by a test technician or test engineer with basic training.

The same generator power control software as used in the final product may be applied in the generator heat-run test to obtain generator loss minimized k_LossMin value.

It should further be noted that the non-linear gain compensation unit 508, 608 may be easily modified for power control based on the modified analytical equation for stator flux/current distribution for the loss minimized k_LossMin value in final product application.

It should further be noted that in an embodiment, a "circuit" or a "unit" may be understood as any kind of a logic implementing entity, which may be special purpose circuitry or a processor executing software stored in a memory, firmware, or any combination thereof. Thus, in an embodiment, a "circuit" or "unit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" or "unit" may also be a processor executing software, e.g. any kind of computer program, e.g. a computer program using a virtual machine code such as e.g. C Code or assembly code.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for operating an electromechanical generator, comprising:
    determining a magnetic field reference parameter based on an electromagnetic power reference representing a desired output of the electromechanical generator,
    determining a scaling factor for adjusting an air-gap magnetization level of the electromechanical generator to reduce loss in operating the electromechanical generator, wherein determining the scaling factor includes determining the scaling factor for which the determined power loss is minimum from among a plurality of scaling factors and comprises measuring the generator temperature for the scaling factors in the order from lowest scaling factor to highest scaling factor wherein when the generator temperature of a scaling factor is measured to be higher than the generator temperature measured for the previous scaling factor, the determining process is stopped and the previous scaling factor is determined as the scaling factor for which the determined power loss is minimal among the scaling factors,
    modifying the magnetic field reference parameter with the scaling factor; and
    operating the electromechanical generator based on at least the modified magnetic field reference parameter.

2. The method according to claim 1, wherein the magnetic field reference parameter is linearly scaled with the scaling factor.

3. The method according to claim 1, wherein the magnetic field reference parameter is any one of a magnetization flux reference and a magnetization current reference.

4. The method according to claim 1, wherein the scaling factor is determined to reduce the sum of a generator copper loss and a generator core loss.

5. The method according to claim 1, wherein the scaling factor is determined to minimize generator loss.

6. The method according to claim 1, further comprising determining the magnetic field reference parameter based on a default power loss optimization criterion which gives the ratio of a demagnetization current and a field power current of the electromechanical generator.

7. The method according to claim 1, wherein the magnetic field reference parameter is determined according to a generator copper loss minimization criterion.

8. The method according to claim 1, wherein the scaling factor is determined as the scaling factor from a plurality of scaling factors for which the determined generator loss is minimal among the scaling factors of the plurality of scaling factors.

9. The method according to claim 8, wherein the scaling factor is determined so that the generator is operated at a demagnetization level given by the magnetic field reference parameter scaled with the scaling factor.

10. The method according to claim 1, wherein the scaling of the magnetic field reference parameter is determined by modifying a default ratio of a magnetization current and a field power current given by the copper loss minimization criterion determining an initial operation condition of the generator.

11. The method according to claim 1, wherein the plurality of scaling factors are within a pre-determined scaling factor interval.

12. The method according to claim 1, wherein the lowest scaling factor of the plurality of scaling factors is set below unity in order to account for generator parameter variation.

13. The method according to claim 1, wherein the magnetic field reference parameter specifies a pre-determined initial demagnetization level.

14. The method according to claim 13, wherein the magnetic field reference parameter specifies a pre-determined initial demagnetization stator flux or a pre-determined initial demagnetization current.

15. A system for operating an electromechanical generator comprising:
    a determining circuit configured to determine a magnetic field reference parameter based on an electromagnetic power reference representing a desired output of the electromechanical generator and configured to determine a scaling factor for adjusting an air-gap magnetization level of the electromechanical generator to reduce loss in operating the electromechanical generator, wherein determining the scaling factor includes determining the scaling factor for which a determined power loss is minimum from among a plurality of scaling factors,
    wherein the determining circuit is configured to measure the generator temperature for the scaling factors in the order from lowest scaling factor to highest scaling factor wherein when the generator temperature of a scaling factor is measured to be higher than the generator temperature measured for the previous scaling factor, determining the scaling factor from the plurality of scaling factors is stopped and the previous scaling factor is determined as the scaling factor for which the determined power loss is minimal among the plurality of scaling factors;
    a modifier configured to modify the magnetic field reference parameter with the scaling factor; and
    a controller configured to operate the electromechanical generator based on at least the modified magnetic field reference parameter.

16. A wind turbine, comprising:
    a tower;
    a shaft disposed on the tower;
    a hub connected to the shaft, and supporting a plurality of blades; and a system coupled to the shaft, the system comprising:
- a determining circuit configured to determine a magnetic field reference parameter based on an electromagnetic power reference representing a desired output of the electromechanical generator and configured to determine a scaling factor for adjusting an air-gap magnetization level of the electromechanical generator to reduce loss in operating the electromechanical generator, wherein determining the scaling factor includes determining the scaling factor for which a determined power loss is minimum from among a plurality of scaling factors,
- wherein the determining circuit is configured to measure the generator temperature for the scaling factors in the order from lowest scaling factor to highest scaling factor wherein when the generator temperature of a scaling factor is measured to be higher than the generator temperature measured for the previous scaling factor, determining the scaling factor from the plurality of scaling factors is stopped and the previous scaling factor is determined as the scaling factor for which the determined power loss is minimal among the plurality of scaling factors;
- a modifier configured to modify the magnetic field reference parameter with the scaling factor; and
- a controller configured to operate the electromechanical generator based on at least the modified magnetic field reference parameter.

* * * * *